Patented June 12, 1951

2,556,743

UNITED STATES PATENT OFFICE 2,556,743

METALLIZED AZO DYES

Robert S. Long, Plainfield, N. J., and Charles W. Smart, Decatur, Ga., assignors to American Cyanamid Company, New York, N. Y., a corporation of Maine No Drawing. Application July 16, 1948, Serial No. 39,186

7 Claims. (Cl. 260—149)

This invention relates to a new class of azo dyestuffs having as one component of the molecule a diarylide of malonic acid. More particularly, the invention relates to metal complexes such as chromium complexes of such dyestuffs.

The dyes of the present invention are metal complexes such as chromium complexes of azo dyes which may be represented by the following formula:

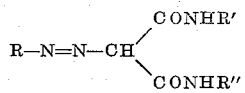

in which R is the radical of a diazotized amine containing at least one metallizable group ortho to the azo linkage and R' and R'' are aryl radicals of the benzene or naphthalene series.

The dyestuffs, the metal complexes of which form the subject matter of the present invention, are of a type which would not be expected to produce satisfactory metallized dyestuffs. Ordinarily, satisfactory metal complexes are produced only if two metallizable groups are present ortho to the azo linkage. The azo dyestuffs used in the present invention, however, contain only one such group. In the past, complexes which contained only one metallizable group have been too unstable for practical operation. The malonic diarylides are known to be scarcely enolized at all, in fact they are insoluble in alkali and only soluble when there is present a solubilizing group such as a sulfonic acid group.

It is not known why the dyestuffs of the present invention with only a single metallizable group ortho to the azo give good complexes which are satisfactory for practical use. It is, therefore, not desired to limit the present invention by any theory of action. Particularly, it is not intended to advance any special theory of the formulation of the metal complex.

It is an advantage of the present invention that azo dyes capable of effective metallization may be prepared from the ordinary diazotized aromatic amines. Of course, amines having a metallizable group artho to the amino group are required as it is necessary that there be at least one metallizable group ortho to the azo linkage in the final dyestuff. The most common metallizable groups are hydroxyl and carboxyl. The following amines are typical of those from which azo dyes can be prepared: anthranilic acid, 4-sulfoanthranilic acid, 5-sulfoanthranilic acid, 2-aminophenol, 2-aminophenol-4-sulfonic acid, 2-amino-4-chlorophenol, 2-amino-4-chlorophenol-5-sulfonic acid, 2-amino-4-chlorophenol-6-sulfonic acid, 2-amino-4-nitrophenol, 2-amino-4-nitrophenol-5-sulfonic acid, 2-amino-4-nitrophenol-6-sulfonic acid, 2-amino-5-nitrophenol, 2-amino-4-methyl-6-nitrophenol, 2-amino-6-nitrophenol-4-sulfonic acid, 1-amino-2-naphthol-4-sulfonic acid, and 1-amino-6-nitro-2-naphthol-4-sulfonic acid.

In common with most metallized azo dyes in the present invention it is possible to use diazotized amines which have groups that are transformed or converted into hydroxyl groups during the metallization step even though they do not exist in this form in the amine prior to diazotization. The most common groups of this nature are the methoxy or halogen. Typical amines of this type are o-dianisidine, 4-chloro-2-aminoanisole, and 4-nitro-2-chloroaniline.

The malonic diarylides which form the coupling components used in the present invention include not only malonic dianilide itself but also its homologues in which the benzene nucleus is substituted by alkyl groups, examples are the toluidides, xylidides and ethylanilides. The effect on the color obtained is generally to deepen the shade when the alkyl groups are present. Malonic diarylides with other nuclear substituents may also be used, for example, the halogenated derivatives such as the bis p-bromo- and bis p-chloroanilides and the bis 2,4-dichloroanilide, and nitrated derivatives such as the bis 3-nitro- and 4-nitroanilides. Also malonic bis-naphthalamides may be used. Dyestuffs of somewhat greater solubility may be obtained by sulfonating the malonic arylides. This has the advantage of facilitating couplings in aqueous solutions and does not require an organic solvent for this step which represents a practical operating economy. Malonic dianilide, for example, is readily sulfonated by ordinary methods, as will be further described below, to the bis-p-sulfoanilide; the p-position of the sulfonic acid groups in the product is proved by hydrolysis to sulfanilic acid. Diarylamides of malonic acid, in which the aryl groups are different may also be employed, for example, the malonic anilide-p-sulfoanilide of the malonic anilide, p-toluidide.

The coupling reaction to form the azo dyestuff which is to be metallized may be effected by usual methods. When the malonic diarylide contains sufficient solubilizing groups the coupling reaction may be effected in aqueous solutions as with any soluble coupling components. However, in the case of most of the malonic diarylides which do not contain sulfonic groups, the water solubility may be insufficient. In such a case it is desirable to add an organic solvent such as pyridine. A further practical advantage of the present invention is that the isolation of the unmetallized dyestuff proceeds smoothly and does not offer any particular difficulties.

The metallization step follows the usual procedure, for example, when the chromium complex is desired an aqueous solution of the dyestuff is refluxed with salts or other suitable compounds of chromium. Typical compounds are: chromic hydroxide, chromic acetate, chromic formate, chromic fluoride, chromic chloride, basic chromic chloride, chromic sulfate, basic chromic naphthalene disulfonates, and chromic chromate.

When complexes of metals other than chromium are desired the salts of the corresponding metals such as copper, cobalt, iron, etc., are used as is customary in producing metallized dyes. Buffers or other agents which control the pH may be added to the metallizing solution. Such control is also effected in accordance with procedures which are common in the metallization of other dyes.

Unmetallizable dyestuffs having the other features of the present invention may be prepared, for example, by coupling diazotized amines such as aniline, para nitroaniline, naphthylamine, sulfanilic acid, and the like with the malonic acid arylides which characterizes the dyestuffs of the present invention. However, dyestuffs containing groups which permit metallization are of greater practical importance.

The dyestuffs of the present invention present a wide variety of shades, especially yellows, oranges, browns, and pinks, according to the substituents present. The fastness properties, including fastness to light and washing, are in general good and in some cases excellent.

The following specific examples illustrate the preparation of various metallized dyes in accordance with the present invention. The parts are by weight. In some cases the dyestuff is isolated as a salt but the formulas of sulfonated dyestuffs show the acid group.

*Example 1*

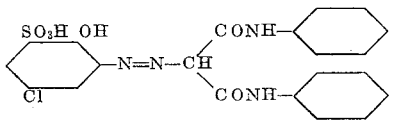

4-chloro-2-aminophenol-6-sulfonic acid (5.6 parts) is dissolved in 50 parts of water and 9 parts of 5N sodium hydroxide solution. The solution is chilled to 8° C. and acidified with 20° Bé. hydrochloric acid, causing the amine to precipitate as a paste. Diazotization is effected with 5N sodium nitrite solution, excess being destroyed with sulfamic acid, and the solution then being neutralized with sodium acetate solution. Seven parts of malondianilide is dissolved in 220 parts of pyridine, chilled to 10°, and treated dropwise with 5 parts of 5N sodium hydroxide solution. To this is added the diazo solution and then 15 parts of 5N sodium hydroxide solution. After coupling is complete, the product is precipitated by the addition of concentrated hydrochloric acid. It dyes wool greenish yellow shades from an acid bath. Red orange shades are obtained by the top chrome and meta chrome methods.

Four parts of the dyestuff thus prepared are metallized by refluxing in 100 parts of water containing 3.8 parts of chromium acetate and 18 parts of 90% formic acid, until the product is completely precipitated in the granular form. The product dyes wool a bright level orange shade of good fastness.

*Example 2*

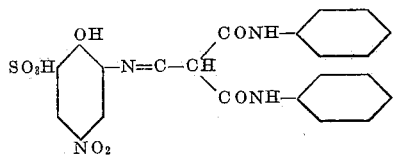

4-nitro-2-aminophenol-6-sulfonic acid (4.7 parts) is dissolved in 40 parts of water containing 7 parts of 20° Bé. hydrochloric acid, chilled to 10°, and diazotized with N sodium nitrite solution, excess then being destroyed with sulfamic acid. The diazo solution is then neutralized with sodium acetate and added to a cold solution of 5 parts of malondianilide in 220 parts of pyridine. The solution is made weakly alkaline by the addition of 4 parts of 5N sodium hydroxide solution, and when coupling is complete, the product separates on acidification with hydrochloric acid. In an acid bath it dyes wool a rich orange-yellow shade. Orange shades are obtained by the top chrome and meta chrome processes.

A mixture of 3.8 parts of the dyestuff thus prepared with 60 parts of water and 20 parts of .675 M chromic acetate solution is refluxed four hours, the pH adjusted to 2.2–2.5 with 5N sulfuric acid, and refluxing continued until metallization is complete. The product is filtered and dried. It dyes wool a golden yellow of good wash fastness.

*Example 3*

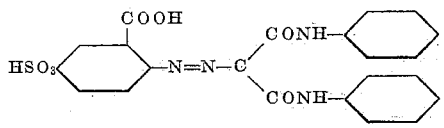

A solution of 11.4 parts 2-amino-5-sulfobenzoic acid, 12 parts of 5N sodium nitrite solution, and 28 parts of 10% sodium carbonate in 40 parts of water is added dropwise to ice-cold hydrochloric acid and the insoluble diazo compound filtered. This is added to a solution of 14 parts malondianilide and 3 parts of sodium methylate in 145 parts of pyridine. The resulting slurry is poured into water, unreacted malondianilide removed by filtration, and the product precipitated by acidification with hydrochloric acid. It dyes wool greenish-yellow shades from an acid bath, as well as by top chrome and meta chrome dyeings.

Metallization is effected by refluxing 13.3 parts of the dyestuff in 350 parts of water containing 100 parts of .50 molar chromic acetate. After one hour there is added 54 parts of 90% formic acid, and after 24 hours, 50 parts of sodium chloride. When metallization is complete the product is filtered. It gives bright lemon yellow dyeings.

*Example 4*

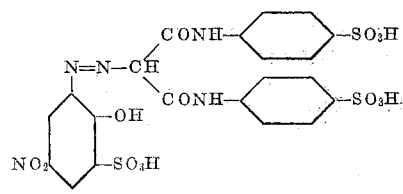

Malonic dianilide (25.4 parts) is sulfonated by heating at 100° C. for two hours in 144 grams of of 100% sulfuric acid. The reaction mixture is then drowned in 350 parts of ice, and the product salted out with 75 parts of sodium chloride. It is hydrolyzed in boiling dilute hydrochloric acid to sulfanilic acid.

4-nitro-2-aminophenol-6-sulfonic acid is diazotized as described in Example 2. Disulfo malondianilide as prepared above (8.3 parts) is is dissolved in 60 parts of water, neutralized with sodium hydroxide, cooled to 10° C., and treated with the diazo. Alkalinity is maintained during coupling with soda ash solution. The product is isolated by filtration. In an acid bath it dyes wool rich bright orange shades. Orange shades are also obtained by top chrome and meta chrome dyeings.

The dyestuff thus prepared (21.1 parts) is refluxed in 100 parts of water and 50 parts of .675 molar chromic acetate solution. After one hour there is added 18 parts of 90% formic acid. After refluxing for 24 hours the solution is treated with 30 parts of sodium chloride and poured into 240 parts of ethanol. The product is filtered and dried. It dyes wool a brilliant orange shade.

*Example 5*

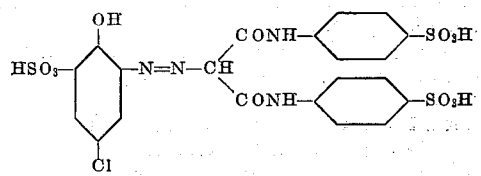

4-chloro-2-aminophenol-6-sulfonic acid is diazotized as described in Example 1. Disulfo malondianilide (21 parts), as prepared in Example 4, is dissolved in 150 parts of water and the pH adjusted to 4-5 with the aid of sodium hydroxide solution. The solution is then chilled to 10° C. and the diazo added. Fifty parts of sodium chloride are added after coupling is complete, and the product allowed to separate. It dyes wool yellow shades from an acid bath, a burnt orange shade by the top chrome method, and a much lighter shade by the meta chrome method.

In the metallization of the product thus prepared, 32.1 parts of the dyestuff are refluxed one hour in 100 parts of water containing 50 parts of .675 molar chromic acetate solution. Ten parts of 5N sulfuric acid are added and refluxing continued 24 hours. The solution is then poured into 240 parts of alcohol and the product filtered. It dyes wool a bright orange shade.

*Example 6*

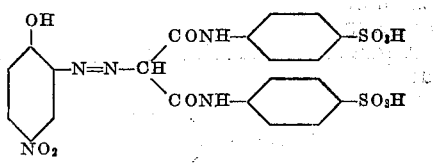

4-nitro-2-aminophenol (7.7 parts) is dissolved in 75 parts of water containing 12 parts of 38% hydrochloric acid, chilled to 5-10°, and diazotized with 5N sodium nitrite solution. A solid diazo compound separates. A solution of 23 parts disulfo malondianilide (as prepared in Example 4) in 150 parts of water is adjusted to pH 4-5 with sodium hydroxide and treated with the diazo followed by 10% sodium carbonate solution to maintain alkalinity. After completion of coupling the product is heated to 70° C. and acidified with hydrochloric acid. The dyestuff gives rich yellow-orange shades on wool from an acid bath. Yellowish rust shades are obtained by the top chrome and meta chrome processes.

Metallization is effected by refluxing 17.4 parts of the dyestuff thus prepared in 200 parts of water containing 50 parts .675 molar chromic acetate. During refluxing dilute sulfuric acid is added periodically reducing the pH finally to 1.6. When metallization is complete the product is filtered. It dyes wool a rich orange shade.

*Example 7*

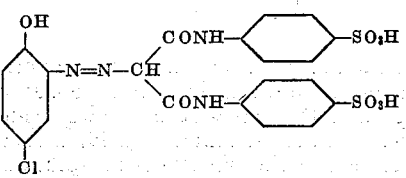

4-chloro-2-aminophenol (7.2 parts) is dissolved in 100 parts of water containing 12 parts 38% hydrochloric acid, cooled to 5-8°, and diazotized with 5N sodium nitrite solution. Excess nitrite is destroyed with sulfamic acid. A solution of 22.8 parts disulfo malondianilide (as prepared in Example 4) in 150 parts of water is neutralized to pH approx. 8 with sodium hydroxide, cooled to 10°, and treated with the diazo. After completion of coupling the mixture is acidified with hydrochloric acid and the product filtered. It dyes wool greenish-yellow shades from an acid bath. By the top chrome method it gives a bright orange shade, and somewhat bluer shade by the meta chrome method.

A solution of 28 parts of the above prepared dyestuff in 250 parts of water and 100 parts of .675 molar chromic acetate solution is refluxed two hours, acidified with 110 parts 90% formic acid, and further refluxed until metallization is complete, there finally being added 35 parts sodium chloride. The product is filtered; it dyes wool a bright reddish orange.

*Example 8*

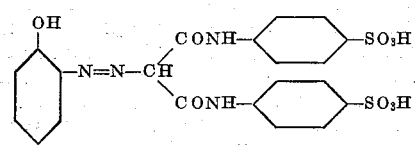

A solution of 5.5 parts o-aminophenol in 75 parts of water and 12 parts concentrated hydrochloric acid is cooled to 5-10° and diazotized with 5N sodium nitrite solution. A solution of 23 parts disulfo malondianilide in 150 parts of water is adjusted to pH approximately 4-5 with sodium hydroxide solution, chilled to 5-10° and treated with the diazo. Alkalinity is maintained with the aid of sodium carbonate solution. After coupling is complete, the mixture is acidified with hydrochloric acid, saturated with sodium chloride, and heated. The product is isolated by filtration. From an acid bath it dyes wool a rich greenish-yellow. By the top chrome method it gives a reddish tan, and a redder shade by the meta chrome process.

To effect metallization, 18.2 parts of the above prepared dyestuff is refluxed 1½ hours in 100 parts of water containing 50 parts of .55 molar chromic acetate solution, treated with 18 parts of formic acid, refluxed 24 hours further, and treated with 18 parts of sodium chloride. The product is filtered. It dyes wool orange shades.

Example 9

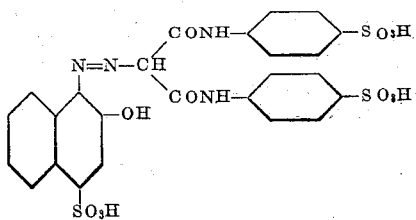

A solution of 23 parts disulfo malondianilide in 150 parts of water is chilled to 5-10° C. and treated with 11.5 parts of the diazo oxide of 1-amino-2-naphthol-4-sulfonic acid, followed by 110 parts of 10% sodium carbonate solution. After completion of coupling, the solution is treated with 45 parts of sodium chloride and the product filtered. From an acid bath it dyes wool yellow camel shades. The top chrome and meta chrome methods give a gray camel shade.

The dyestuff thus prepared (30.3 parts) is refluxed in a mixture of 50 parts of water and 100 parts of .675 molar chromic acetate solution, there being added after one hour 12 parts of 5N sulfuric acid. When metallization is complete the reaction mixture is poured into 120 parts of alcohol and the product ground under acetone. It dyes wool a bright red of bluish shade.

Example 10

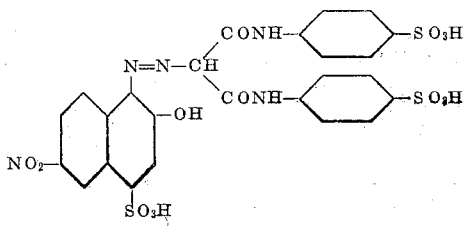

The diazo of 6-nitro-1-amino-2-naphthol-4-sulfonic acid is coupled with disulfo malondianilide by the procedure of Example 9, and metallized in the same way. It dyes wool a red of yellowish tone. The product dyes wool tan shades from an acid bath. By the top chrome method camel shades are obtained, and old rose shades by the meta chrome method.

Example 11

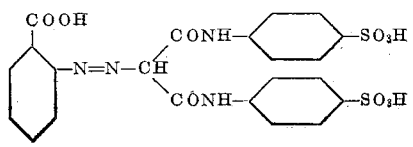

A solution of 7.1 parts of anthranilic acid in 150 parts of water and 9 parts of 20° Bé. hydrochloric acid is chilled to 10° C. and diazotized with 5N sodium nitrite solution. A solution of 21 parts of disulfo malondianilide in 150 parts of water is neutralized to pH approximately 5 with sodium hydroxide, chilled to 10° C., and treated with the diazo, followed by 110 parts of 10% sodium carbonate solution. When coupling is complete the solution is strongly acidified and the product filtered. It dyes wool greenish yellow shades from an acid bath and somewhat similar shades by the top chrome and meta chrome methods.

The dyestuff thus prepared is metallized by refluxing 11 parts in 50 parts of .675 molar chromic acetate solution at a pH of 3.15. When metallization is complete the solution is treated with 10 parts of sodium chloride. The product is filtered; it dyes wool a bright yellow.

Example 12

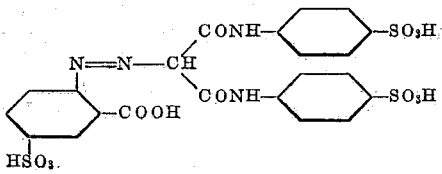

A solution of 10.9 parts of 5-sulfo-2-aminobenzoic acid in 400 parts of water and 7.1 parts of 38% hydrochloric acid is cooled to 10° and diazotized with 5N sodium nitrite solution. A solution of 21 parts of disulfo malondianilide in 150 parts of water is neutralized to pH approximately 5 with sodium hydroxide, cooled to 10° C. and then treated with the diazo followed by 10 parts of sodium carbonate. After completion of coupling, the product is salted out with sodium chloride and acid. It dyes wool tan shades from an acid bath.

Metallization is effected by refluxing 16 parts of the above prepared dyestuff in 50 parts of water and 50 parts of .675 molar chromic acetate solution. After one hour there is added 12 parts of 5N sulfuric acid. When metallization is complete the reaction mixture is poured into 160 parts of ethanol and the product ground under alcohol. It dyes wool greenish shades.

Example 13

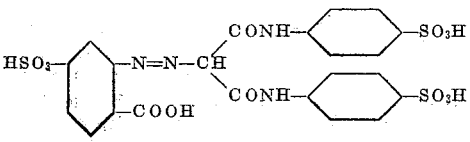

4-sulfo-2-aminobenzoic acid is diazotized and coupled with disulfo malondianilide according to Example 12 procedure. It dyes wool greenish-yellow shades of superior fastness properties. The product dyes wool corn yellow shades from an acid bath. The top chrome method gives a greenish yellow and the meta chrome method much redder shades.

We claim:
1. A metallized complex of a dye of the formula:

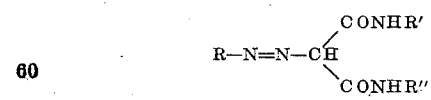

in which R is the radical of a diazotized aromatic amine selected from the benzene and naphthalene series having in the ortho position to the azo linkage a metallizable substituent, and R' and R'' are radicals of the benzene series.

2. A metallized dye according to claim 1 in which the metal is chromium.

3. A chromium complex according to claim 2 in which the malonic diarylide is of a monosulfonated amine of the benzene series.

4. A chromium complex according to claim 3 in which the malonic diarylide is of sulfanilic acid.

5. A chromium complex of the dyestuff of the formula:
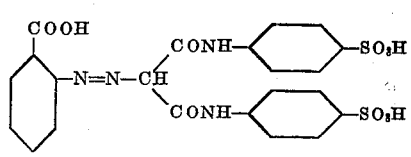
6. A chromium complex of the dyestuff of the formula:
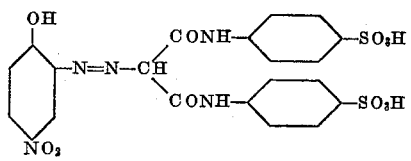
7. A chromium complex of the dyestuff of the formula:
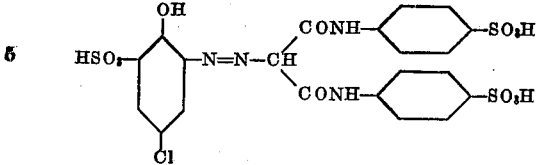
ROBERT S. LONG.
CHARLES W. SMART.
REFERENCES CITED
The following references are of record in the file of this patent:
UNITED STATES PATENTS
| Number | Name | Date |
|---|---|---|
| 2,305,095 | Mackenzie | Dec. 15, 1942 |